US012803838B2

(12) United States Patent
Zinner et al.

(10) Patent No.: US 12,803,838 B2
(45) Date of Patent: Nov. 17, 2026

(54) METHOD FOR THE DYNAMIC CONFIGURATION OF SENSORS AND CONTROL UNITS IN AN ETHERNET NETWORK

(71) Applicant: Continental Automotive Technologies GmbH, Hannover (DE)

(72) Inventors: Helge Zinner, Regensburg (DE); Julian Brand, Regensburg (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 0 days.

(21) Appl. No.: 18/258,277

(22) PCT Filed: Dec. 15, 2021

(86) PCT No.: PCT/DE2021/200262
§ 371 (c)(1),
(2) Date: Jun. 19, 2023

(87) PCT Pub. No.: WO2022/128025
PCT Pub. Date: Jun. 23, 2022

(65) Prior Publication Data

US 2024/0297808 A1 Sep. 5, 2024

(30) Foreign Application Priority Data

Dec. 18, 2020 (DE) ..................... 10 2020 216 278.6

(51) Int. Cl.
*H04L 12/40* (2006.01)
*H04L 12/403* (2006.01)

(52) U.S. Cl.
CPC .... *H04L 12/40143* (2013.01); *H04L 12/4035* (2013.01)

(58) Field of Classification Search
CPC ........... H04L 12/40143; H04L 12/4035; H04L 12/413; H04L 2012/40273
See application file for complete search history.

(56) References Cited

U.S. PATENT DOCUMENTS 5,600,651 A * 2/1997 Molle .................. H04L 12/413 370/448
5,784,375 A 7/1998 Kalkunte
(Continued)

FOREIGN PATENT DOCUMENTS

CN 102959532 A 3/2013
EP 2585940 A1 5/2013
(Continued)

OTHER PUBLICATIONS

International Search Report and Written Opinion of the International Search Authority, dated Mar. 25, 2022, for counterpart PCT application PCT/DE32021/200262.
(Continued)

*Primary Examiner* — Rasheed Gidado

(57) ABSTRACT

A method for dynamically configuring devices in an Ethernet network, including: a head node a) determining the number of active nodes, b) classifying the identified nodes into two or more classifications of nodes to prioritize the Ethernet network communication, and c) receiving reservation requests from at least some of the multiplicity of nodes, and d) allocating time slots, in response to reservation requests, to one or more nodes in the upcoming communication window, the allocations based on a node priority and the priority being allocated to the nodes in accordance with their classification. After the active nodes have been determined, the nodes are dynamically configured, and a timer of the respective node is selected and started, with each active node respectively assigning the smallest possible ID to
(Continued)

itself. This leads to a bus access of the respective node and, if there is bus activity, the other network nodes behave passively.

6 Claims, 11 Drawing Sheets

(56) References Cited

U.S. PATENT DOCUMENTS

| | | | | |
|---|---|---|---|---|
| 5,838,688 | A | 11/1998 | Kadambi | |
| 10,673,713 | B2 * | 6/2020 | Hanatani | H04L 9/0822 |
| 11,888,574 | B2 * | 1/2024 | Bai | H04B 7/022 |
| 2005/0213503 | A1 | 9/2005 | Guo | |
| 2006/0159123 | A1 * | 7/2006 | Fleury | H04L 12/40065 370/468 |
| 2011/0170525 | A1 * | 7/2011 | Lee | H04W 74/04 370/338 |
| 2011/0317584 | A1 * | 12/2011 | Wu | H04L 12/2803 370/254 |
| 2019/0145592 | A1 * | 5/2019 | Lawson | H02S 40/38 362/183 |
| 2019/0230705 | A1 * | 7/2019 | Beruto | H04J 3/0652 |
| 2020/0136857 | A1 | 4/2020 | Yun | |

FOREIGN PATENT DOCUMENTS

| | | | |
|---|---|---|---|
| WO | 2019014754 | A1 | 1/2019 |
| WO | 2019160569 | A1 | 8/2019 |
| WO | 2022117167 | A1 | 6/2022 |
| WO | 2022117168 | A1 | 6/2022 |
| WO | 2022122093 | A1 | 6/2022 |
| WO | 2024125731 | A1 | 6/2024 |

OTHER PUBLICATIONS

Search Report from the German Patent Office, dated Nov. 26, 2022 for counterpart DE patent applicatin 102020216278.6.

Chinese Office Action dated May 20, 2025 for the counterpart Chinese Patent Application No. 202180083587.5 and machine translation of same.

Examination Report dated Sep. 11, 2025 from corresponding European patent application No. 21843586.5.

Second Office Action dated Sep. 17, 2025 from corresponding Chinese patent application No. 202180083587.5.

Decision of Rejection dated Jan. 13, 2026 from corresponding Chinese patent application No. 202180083587.5.

* cited by examiner

| | Bus network | Switched network |
|---|---|---|
| No. of PHYs | 4 | 6 |
| Connectors | Fewer connectors with less pins | |
| Cables | less cabling | |
| Resources | shared | exclusively |

METHOD FOR THE DYNAMIC CONFIGURATION OF SENSORS AND CONTROL UNITS IN AN ETHERNET NETWORK

CROSS REFERENCE TO RELATED APPLICATIONS

The present application is a National Stage Application under 35 U.S.C. § 371 of International Patent Application No. PCT/DE2021/200262 filed on Dec. 15, 2021, and claims priority from Germany Patent Application No. 10 2020 216 278.6 filed on Dec. 18, 2020, in the Germany Patent Office, the disclosures of which are herein incorporated by reference in their entireties.

TECHNICAL FIELD

The present invention relates to a method for dynamically configuring sensors and control devices in an Ethernet network in a motor vehicle, to a control device, and to an Ethernet on-board network.

BACKGROUND

With 10 Mbit/s (IEEE802.3ch), in addition to 100 Mbit/s; 1000 Mbit/s and the ongoing multi-gigabit standardizations, another Ethernet standard will be available for automotive applications.

One variant of the new standard is the CSMA/CD-based multidrop mode. This differs significantly from the other Ethernet variants (>10 Mbit/s), since this pursues the aim of being able to design Ethernet more cost-effectively and thus also of addressing simpler control devices. This standard does not require any switches (switch ICs), but rather is designed as a bus (similar to CAN). This roughly halves the number of required PHYs (transceivers). Ethernet is thus becoming a serious competitor to CAN/CAN-FD and FlexRay, as it is able to significantly reduce system costs. Furthermore, typical automotive interfaces such as SPI instead of xMII are also possible for communication between controllers and physical transceivers (PHYs).

FIG. 1 compares features of switched Ethernet and the “bus Ethernet” (multidrop) as defined in the IEEE standard IEEE P802.3cg. The most notable difference here is that the resources, the bus access, are available exclusively with switched Ethernet, which means that any Ethernet node (ECU) is able to transmit at any time without collisions occurring in the process. A shared medium (“shared media”) is used in the new Ethernet bus implementation with multidrop mode, that is to say it is necessary to hold off bus access until this resource is available.

The IEEE P802.3cg standard uses, inter alia, a newly defined mechanism (PLCA-Physical Layer Collision Avoidance) to avoid collisions during bus access and to implement fair access. In this case, only exactly one PHY (Physical Transceiver) ever receives access to the bus at any one time. This makes it possible to avoid collisions. Access is based on what is called a round-robin method. Each ECU (node) on the bus has the opportunity to transmit once within a defined cycle or order.

What is known as a head node, which takes on the function of a network controller, in this case determines the cycle and recurrently transmits “beacons” on the bus. The nodes thus start a timer on the basis of their previously defined identity ID, which determines the orders as to when they are allowed to transmit, and, after the timer has expired and it is recognized that they are next, they are allowed to transmit.

Figure 1:
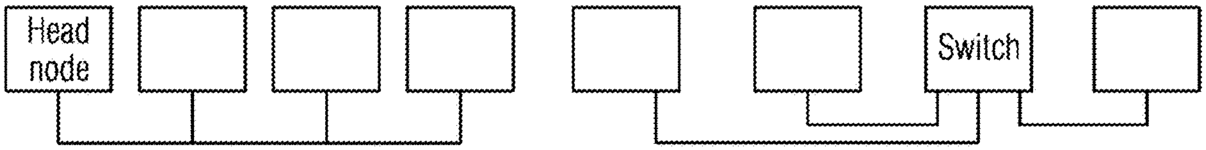

EP 2 585 940 A1 describes systems and methods for scheduling network communication in a managed network may comprise a network controller that recognizes multiple network nodes; the network controller classifies the recognized network nodes into two or more classifications of nodes in order to prioritize network communication at the node level; the network controller, which receives reservation requests from at least some of the multiplicity of network nodes, wherein the reservation requests request one or more time slots for their respective network nodes in an upcoming communication window; and the network controller allocates time slots in the upcoming communication window to one or more network nodes in response to reservation requests, wherein the allocation is based on a priority of the network nodes, and wherein the priority is allocated to the nodes in accordance with their classification. That patent application describes that a network controller creates a cyclic media access plan (MAP) in which the access operations of the network nodes are defined in each cycle. The basis is the required quality of service, the reservation requests from the respective nodes and their priority/lower priority, from which the network controller creates the MAP. The network controller may also automatically send MAP messages without reservation requests.

In US 2005213503A1, in accordance with certain described implementations, a coordinating device performs bandwidth allocation procedures based on information from previously unsatisfied bandwidth allocation requests and responds to current bandwidth allocation requests. The current bandwidth allocation requests specify the currently requested bandwidth amounts for multiple streams, and the current bandwidth allocation requests may be received from multiple entities with multiple streams. The information from previously unsatisfied bandwidth allocation requests is taken into consideration when allocating the available bandwidth between the multiple streams and multiple entities for the currently requested bandwidth amounts. When planning the bus access of the network nodes, the ‘unserved’ access reservation from the previous cycle is also taken into consideration by the head node.

WO 2019 014 754 A1 discloses a configurable vehicle management system includes a receiving unit adapted to receive a message associated with a vehicle resource from a communication network of the vehicle. A control unit is designed to determine a vehicle resource associated with the received message. An integration unit includes an external network connected to the control unit, and the integration unit includes at least one node, the at least one node being configured to send an external message to the control unit via the external network. The control unit converts the external message into an appropriate message that is sent to the vehicle resource.

WO 2019 160 569 A1 describes systems and methods for operating electronic control units (ECUs) across multiple ECU domains in a motor vehicle configuration. A first environmental sensor for an advanced driver assistance system (ADAS) may generate a first output. A sensor connectivity switch may route the first output to a first ECU in one of the non-ADAS domains in order to generate a second output. Each of the non-ADAS domains may include at least one ECU. A second ECU in a domain for ADAS can use the second output to perform ADAS operation or autonomous driving in vehicle environments.

In contrast to a switched network (as with 100/1000 etc. Mbit/s), with 10 Mbit/s, as described, the bus cannot be accessed immediately, but rather it is necessary to wait for the respective time.

Partial networking (aka sleep/wakeup) is becoming an increasingly important function for motor vehicles and, for example, also for the Ethernet bus. In this case, control devices are woken up or put to sleep as required (also via the bus), in order, for example, to save energy or to start them up.

Compared to other Ethernet types, the 10 Mbit bus offers a significantly lower data rate, which is why special consideration has to be given to efficiency of the data transmission and the latency of the transmission and also the access time. If security also becomes part of the 10 Mbit/s system, then there is hardly any remaining data rate for payload data, as is similarly the case for current CAN-FD implementations.

With the partial networking function, it is necessary to give additional consideration to the access times and the efficiency of the bus, since this is a new scenario that was not considered in the standard.

In contrast to a switched network (as with 100/1000 etc. Mbit/s), with 10 Mbit/s, as described, the bus cannot be accessed immediately, but rather it is necessary to wait for the dedicated transmission time in each case. Automotive 10 Mbit/s or 802.3cg PLCA does not work with plug and play like "normal" Ethernet. Each node must be configured with a specific ID (ranking). This must be unique on the bus and also coordinated. The ID cannot be assigned randomly and cannot be changed without changing the other IDs.

In addition, there is no possibility of automatic configuration nowadays. A manual configuration will be required, which is more error-prone, takes more time to flash, costs more money, takes more time for the vehicle manufacturer to configure, cannot be changed if there are changes in the system and is inflexible for variant management.

The head node will be implemented either in a head unit, a gateway, a fusion unit or generally in a zone controller, that is to say usually on the same control device from which updates or diagnostic queries also emanate.

It is known to use what is known as a burst mode, in which nodes are able to send at most 255 packets during their cycle, but this mode needs to be statically preconfigured and maintained.

In partially automated and highly automated driving, there are increasing demands on the vehicle that require hard real-time support from the transmission network and the protocols, as is already the case at present in aircraft or industrial automation.

An on-board electrical system will also be much more flexible in the future than it is today. Nodes are deactivated during operation when they are not needed (this is also called partial networking). This in turn means that the on-board electrical system will change dynamically to a very large degree at runtime. The disadvantages of manual configuration and thus the specific software should be eliminated. Platform-dependent software is expensive and may also be harder to sell. An on-board electrical system will also be much more flexible in the future than it is today. Sensors and control devices will be added ad hoc in the future. This in turn means that the on-board electrical system will change dynamically to a very large degree at runtime.

SUMMARY

The object of the present disclosure is to flexibly adapt the new Ethernet technologies to current requirements in a cost-optimized manner and with little implementation effort.

The object is addressed by the features of the method as claimed in claim 1, the control device as claimed in claim 4 and the Ethernet network as claimed in claim 6.

The present disclosure advantageously adapts the new Ethernet technologies in terms of costs and implementation effort for use in motor vehicles.

The present disclosure proposes a method that automatically configures the 10 Mbit/s Ethernet network and the control devices, respectively. The present disclosure proposes a method in which the control devices can be connected to the bus in an unconfigured form and configure themselves autonomously after start-up. No ECU-specific special software is necessary here, but rather the Ethernet software can be the same on all control devices (sensors). Start-up, including synchronization within the bus, can take place within a few milliseconds despite automation (i.e., not preconfigured).

The method proposes that the control devices each assign the smallest possible ID to themselves and then try to access the bus. The attempt is controlled using timers, which are started at random, so that there is inevitably a bus access within a very short timeframe. If bus activity is detected, all other control devices behave passively.

It becomes easier to configure and test microphones, ultrasound, radar and many other presently CAN-based control devices. The solution allows products to be designed more flexibly without interfering with large parts of the software. This saves a complex configuration and thus saves configuration effort.

The development of sensor-based applications, e.g., automated driving, data loggers, and diagnosis can be advantageously simplified by the embodiments of the present disclosure. The idea according to the present disclosure can be implemented without additional financial expenditure and hardware costs and while complying with the standard. The use of the newly introduced Ethernet protocols in motor vehicles necessitates mechanisms that make use of simple techniques and given properties of technologies in order to be able to do without expensive implementations and further additional hardware. The network system according to the present disclosure is improved in terms of quality. The method according to the present disclosure offers a new method of automatic configuration for the 10 Mbit/s Ethernet bus.

This present disclosure sets forth a method that allows software to be designed more flexibly and makes the best of the underlying system without having to program it permanently into software beforehand. The present disclosure permits software developers and software architects to provide software/applications that may be tailored to the requirements of the application case more flexibly and precisely. Incorporating the cited methods into software allows optimization to take place in each case within the control device. This means that software can be developed in a more platform-independent manner. A further advantage of this present disclosure is that the usual hardware does not have to be changed, but rather the existing hardware can continue to be used. The new method can be integrated into an existing network without damaging existing devices. The standard is not infringed since the existing protocol may be used. As a result of the automatic configuration of the physical layer, a wide variety of variants can be developed and produced without having to manually create special configurations. This means that products get to market faster.

The advantage of the application-specific determination of a more accurate and predictable delay is an improvement in the scheduling and execution of communication in the vehicle. This means that existing bus systems are able to be used more efficiently and the jump to expensive technology with a higher bandwidth is able to be avoided. This may also affect the required buffer storage, which may then be dispensed with or made smaller. Fusions of different data, for example ultrasound, radar or microphones, may thereby be improved and made more accurate. Furthermore, the logging of data may be made even more precise.

Nowadays, applications are tailored and adapted to a platform. This present disclosure sets forth methods that allow software to be designed somewhat more flexibly and make the best of the underlying system without having to program it permanently into software beforehand. The starting point is what is known as the worst case, which costs resources and money and compromises quality. The present disclosure permits software developers and software architects to provide software/applications that may be tailored to the requirements of the application case more flexibly and precisely. Incorporating the described method into our software allows optimization to take place in each case within the control device. This means that software may be developed in a more platform-dependent manner.

Partial networking as a system function has even greater effects on the overall system if, for example, the efficiency of the bus may be influenced thereby and control devices no longer waste time "waiting", which unfortunately has to be the case with 10 Mbit/s technology.

The new technologies may no longer be held back in motor vehicles. Protocols such as IP, AVB and TSN have thousands of pages of specifications and test suites. It is not an immediate given that these new protocols are controllable in motor vehicles.

An advantage of this present disclosure is that the usual hardware does not have to be changed, but rather the existing hardware can continue to be used. The new method can be integrated into an existing network without damaging existing devices. The standard is not infringed since the existing protocol may be used. These sensors in particular should be as cheap as possible in order to serve the mass market. If a more expensive interface such as a cable/plug is able to be dispensed with, this means great added value. In addition, the quality of the data improves the faster the data reach the bus and the less waiting and/or storage is required.

The proposal addresses the problem that the beacon cycle time depends only on the bus and its configuration, but not on the individual node or its requirements. The fundamental revolution of the new architectures is characterized by the centering of the software on fewer and fewer computing units. These so-called servers or central computers no longer consist of just one µC or µP, but rather contain multiple µC, µP, SOC and also Ethernet switches with a large number of ports. They represent a separate local area network, each with individual software, which also means that the respective software components do not (cannot) know that they are communicating for example with components that are located in the same housing. A zone architecture with central servers is known. Here, on the one hand, the server contains many powerful processors and, on the other hand, a lot of software or applications are executed on it. The communication effort within the control device is enormous, and this represents a separate local area network. All of the software of the vehicle will be executed here in the future and each controller has its own software stack that is provided by different suppliers.

Concepts in order to dynamically transfer functions and applications to other control devices/processors, that is to say also in order to optimize them, are known. This is referred to as live migration, reallocation or migration. The series application for the transfer of software to other ECUs/processors is known.

By virtue of the new architectures, now for the first time there are possibilities for implementing software on different ECUs as well, since the hardware is becoming more generalized and the software less platform-dependent, wherein before now this was not possible with all functions and ECUs. Therefore, what software will run on what control device (server) is not always definite at the time when the system is designed. The shift in software is not limited here to ECU-to-ECU operations, however, but applies even more to controller-to-controller operations within the same ECU.

The concept may be implemented without additional financial expenditure, such as hardware costs, and while complying with the standard. The use of the newly introduced Ethernet protocols in motor vehicles necessitates mechanisms that make use of simple techniques and given properties of technologies in order to be able to do without expensive implementations and further additional hardware. The network system according to the present disclosure is improved in terms of reliability.

The advantage of the application-specific determination of a more accurate and predictable delay is an improvement in the scheduling and execution of communication in the vehicle. This means that existing bus systems are able to be used more efficiently and the jump to expensive technology (higher bandwidth) is able to be avoided. This may also affect the required buffer storage, which may then be dispensed with (or made smaller). Fusions of different data (for example ultrasound+radar or microphones) may thereby be improved and made more accurate. Furthermore, the logging of data can be made even more precise.

If it is a software update, then a more realistic time window may be reported back through the present disclosure and the worst case does not have to be assumed. Thus, downloads/updates are possible that would otherwise never be started or would be started later.

The method according to the present disclosure may be used in other industrial fields that use 10 Mbit/s Ethernet, for example in industrial automation.

The object is advantageously addressed by a method for optimizing the transmission data rate in a sensor network in partial networking in an Ethernet network, wherein the method includes:

a) a head node determining the number of active nodes,
b) the head node classifying the identified nodes into two or more classifications of nodes in order to prioritize the Ethernet network communication,
c) the head node receiving reservation requests from at least some of the multiplicity of nodes,
d) allocating time slots, in response to reservation requests, to one or more nodes in the upcoming communication window, the allocations being based on a priority of the nodes and the priority being allocated to the nodes in accordance with their classification, wherein, after the number of active nodes has been determined, the nodes are dynamically configured, and a timer of the respective node is selected and started, with each active node respectively assigning the smallest possible ID to itself, whereby this leads to a bus access of the respective node and, if there is bus activity, the other nodes in the Ethernet network behave passively.

A further advantageous embodiment of the method is distinguished by the fact that, when there is a bus access that is successful, the timer is incremented.

A further advantageous embodiment of the method is distinguished by the fact that, when there is a bus access that is unsuccessful, the timer is decremented.

A further advantageous embodiment of the method is distinguished by the fact that, after the bus position (node ID) of the sleeping nodes has been determined, a check is performed in order to determine whether there is a node with a higher bus position (node ID), which does not represent a sleeping node, which is not active, and the bus position (node ID) of the active nodes is optimized.

A further advantageous embodiment of the method is distinguished by the fact that, after the necessary download data rate has been determined, a currently free data rate in the Ethernet network in the last bus cycle ($D_{frei}$) of the Ethernet network is determined and a necessary data rate per bus cycle ($D_{zus}$) is determined, wherein, if the free data rate in the Ethernet network in the last bus cycle ($D_{frei}$) of the Ethernet network is greater than or equal to the necessary data rate per bus cycle ($D_{zus}$), no change is made in the next bus cycle, and, if the free data rate in the Ethernet network in the last bus cycle ($D_{frei}$) of the Ethernet network is less than the necessary data rate per bus cycle, a change is made in the next bus cycle.

Particularly advantageous is an implementation by a control unit for an Ethernet network, which, as a first node, is designed, as a control unit, to transmit a signal to a second control unit of the Ethernet on-board network and to receive the signal from the second control unit; to determine a propagation time of the signal on a connection path to the second control unit; to determine a maximum speed of the connection path based on the propagation time; and to determine a type of a transmission medium of the connection path based on the maximum speed, at least comprising a microprocessor, a volatile memory and non-volatile memory, at least two communication interfaces, a synchronizable timer, the non-volatile memory containing program instructions that, when executed by the microprocessor, wherein an embodiment of the method according to the present disclosure is able to be implemented and executed.

Particularly advantageous is the implementation by an Ethernet network for a motor vehicle, having a first control unit and a second control unit, wherein the control units are connected to one another via at least one connection path, and the first control unit is designed to perform the method according to the present disclosure.

One particularly advantageous embodiment of the Ethernet on-board network is distinguished by the fact that the Ethernet network has a third control unit, which is connected to the first control unit only indirectly and is connected to the second control unit directly by way of a third connection path, wherein the third control unit is designed to determine a propagation time of a third signal on the third connection path, wherein the first control unit is designed to trigger the determination of the propagation time of the third signal by way of a service message to the third control unit.

By implementing the methods disclosed by the present disclosure, it is possible to use platform-independent software with higher quality and durability. The present disclosure may be used in other communication systems with clock synchronization components and embedded systems.

DRAWINGS

Figure 2:
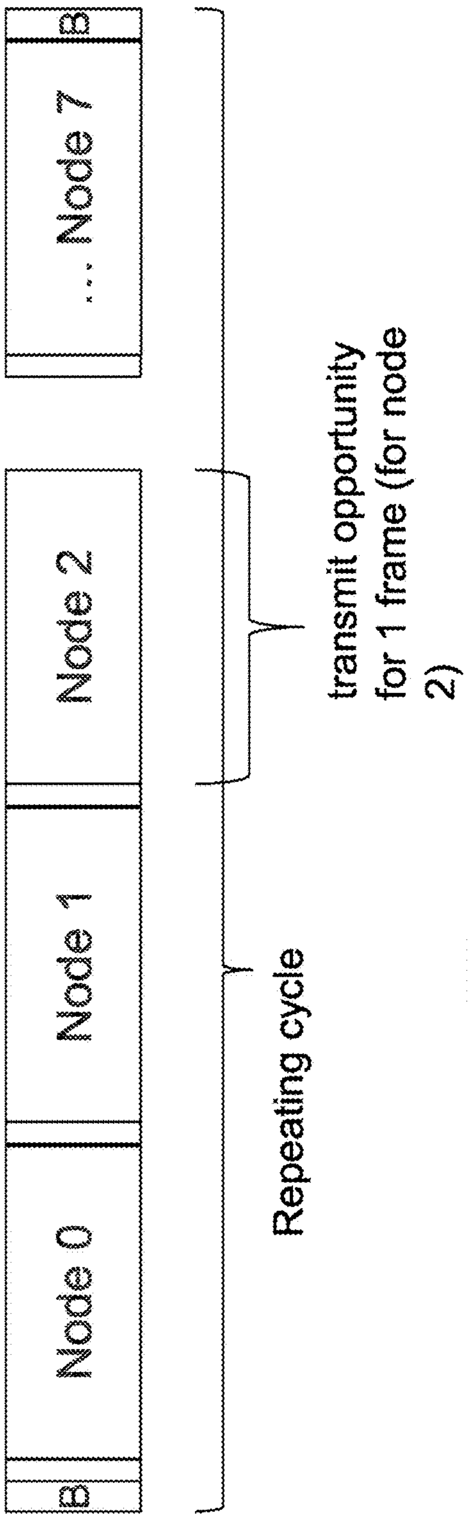
FIG. 2 shows the basic flow of communication on the Ethernet bus. After the beacon has been transmitted, node 0 is next and, when it has finished its transmission, the next node is allowed to transmit (typically only a single Ethernet frame in each case may be transmitted in the slot).
Figure 3:
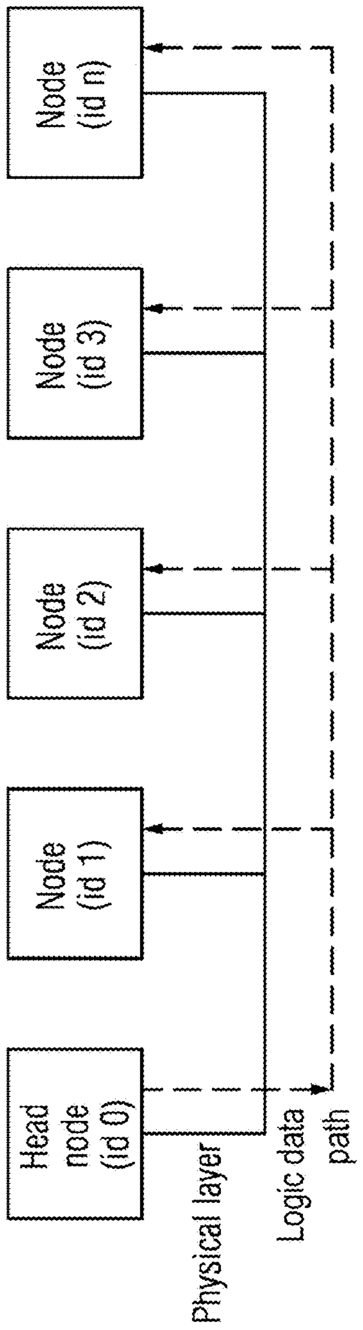
FIG. 3 illustrates the physical representation of the Ethernet bus with stubs.
Figure 4:
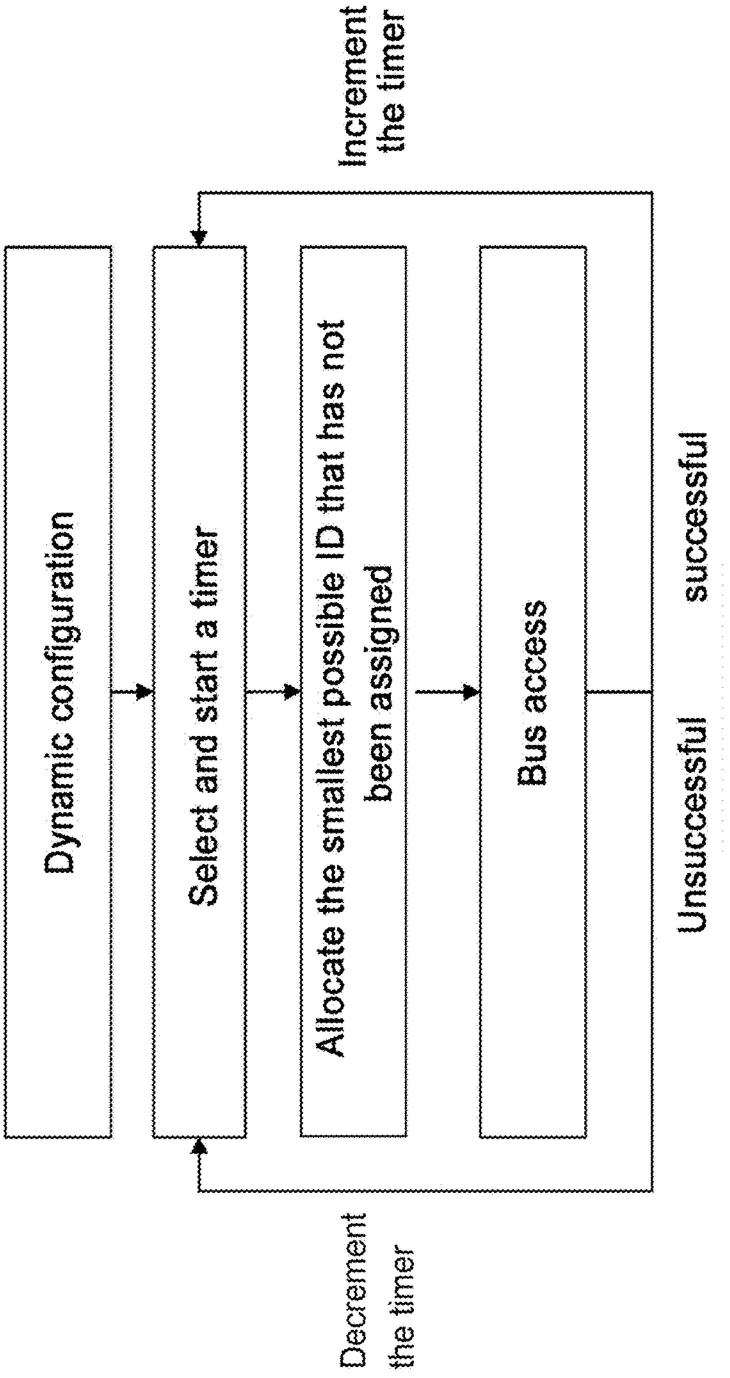
Figure 5:
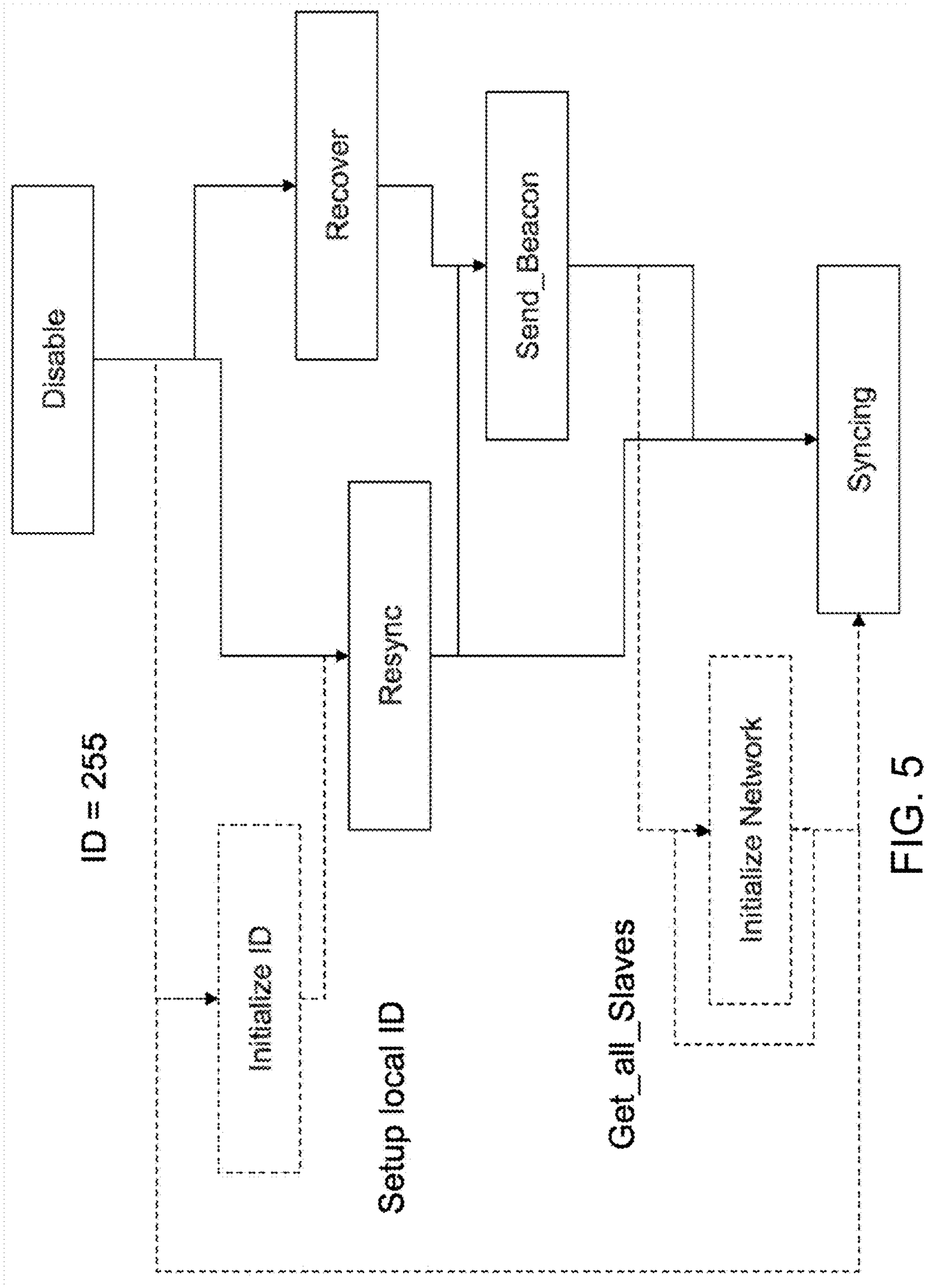
Figure 6:
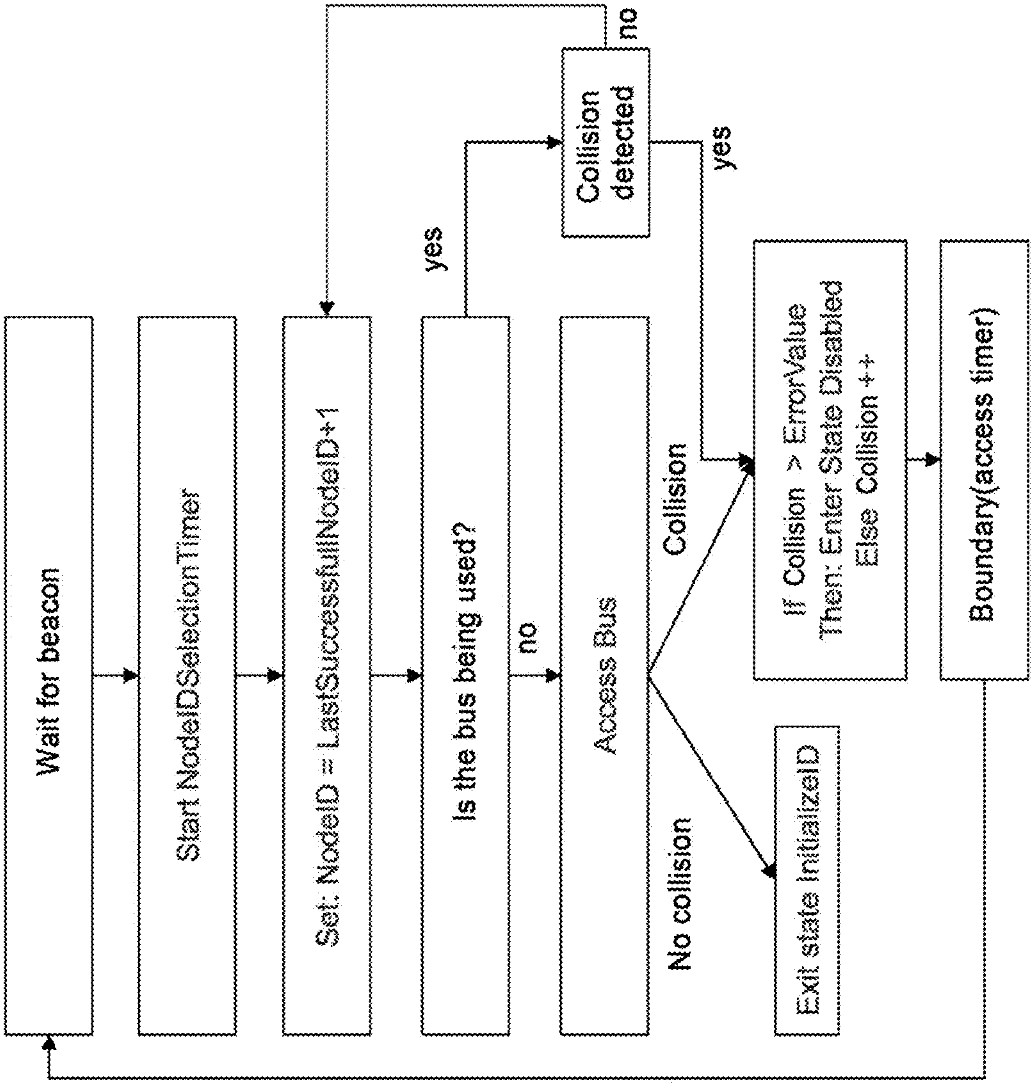
Figure 7:
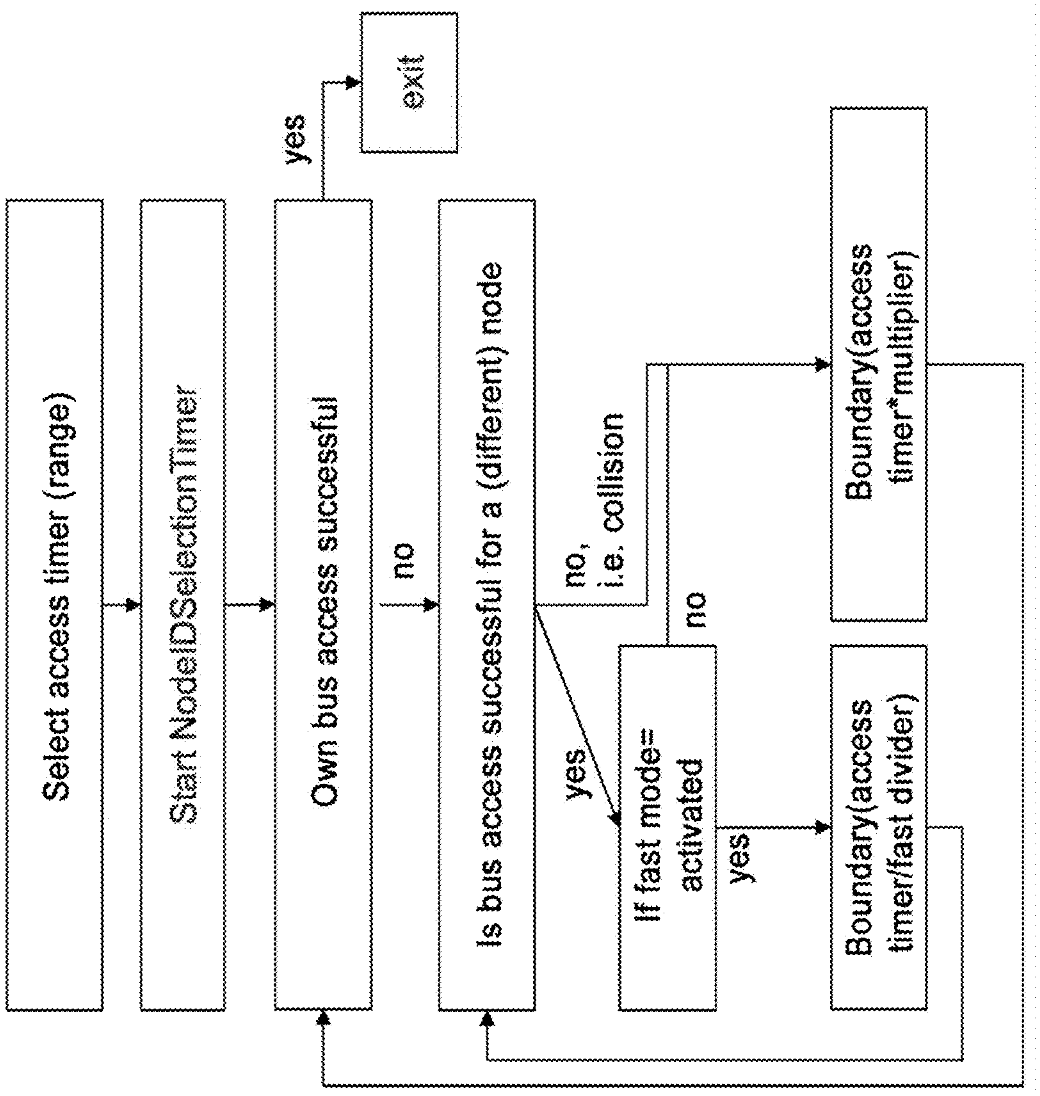
Figure 8:
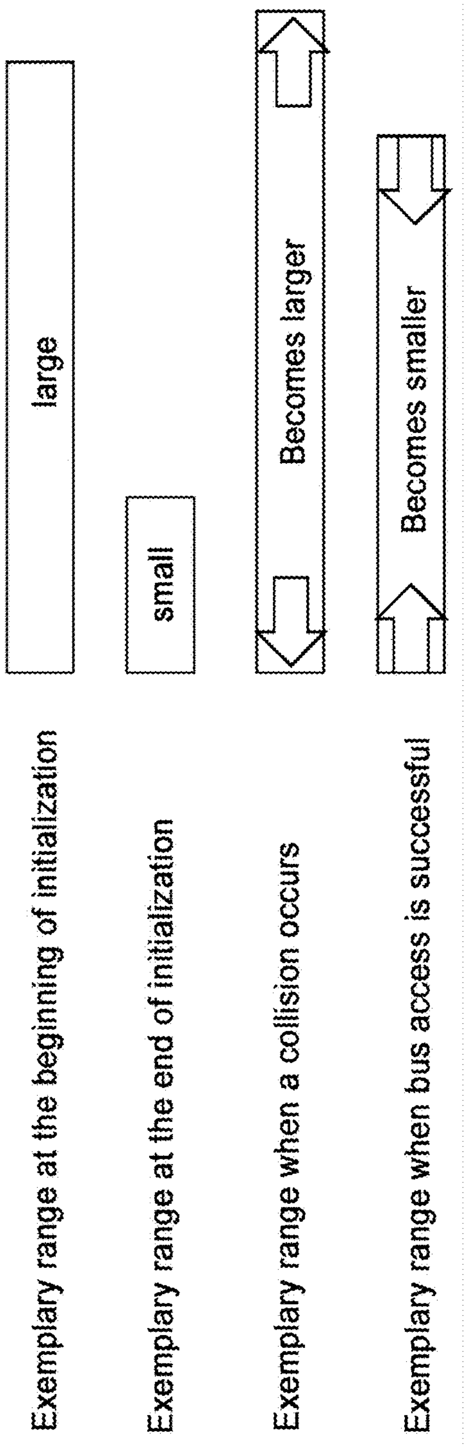
Figure 9:
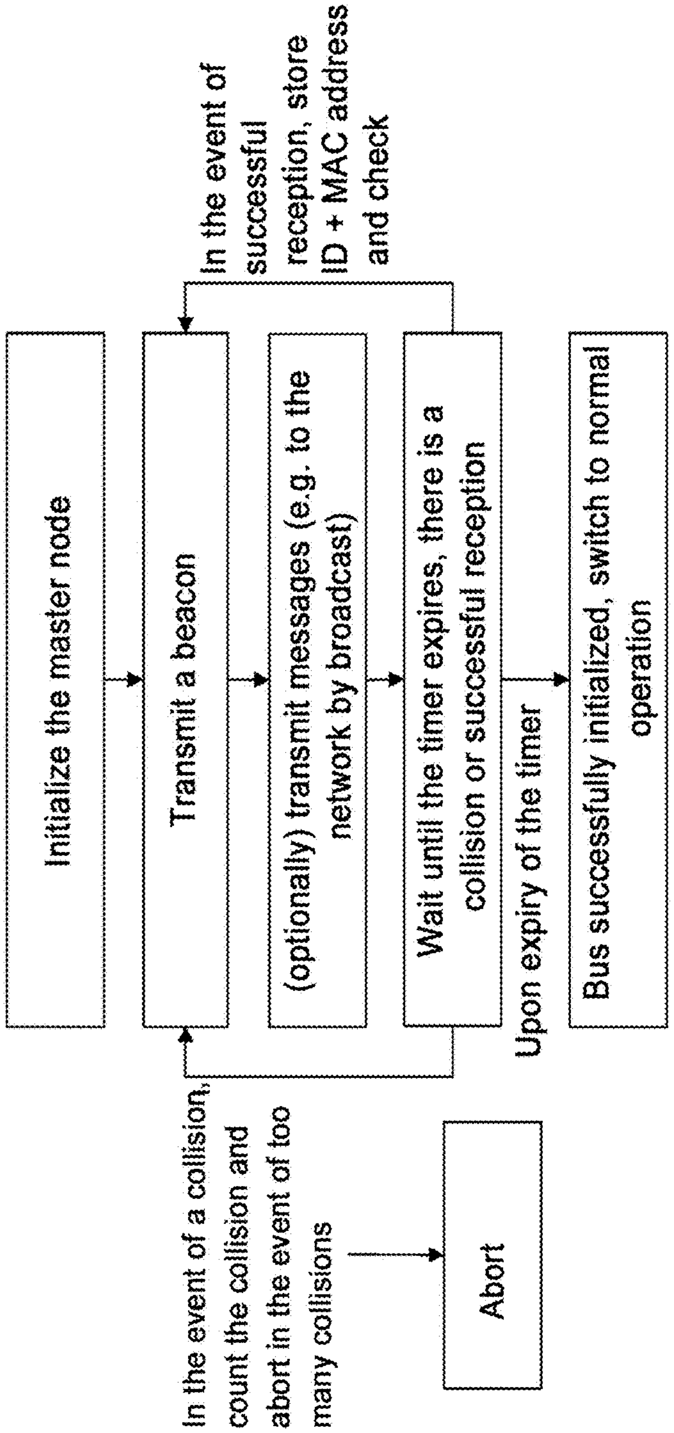
Figure 10:
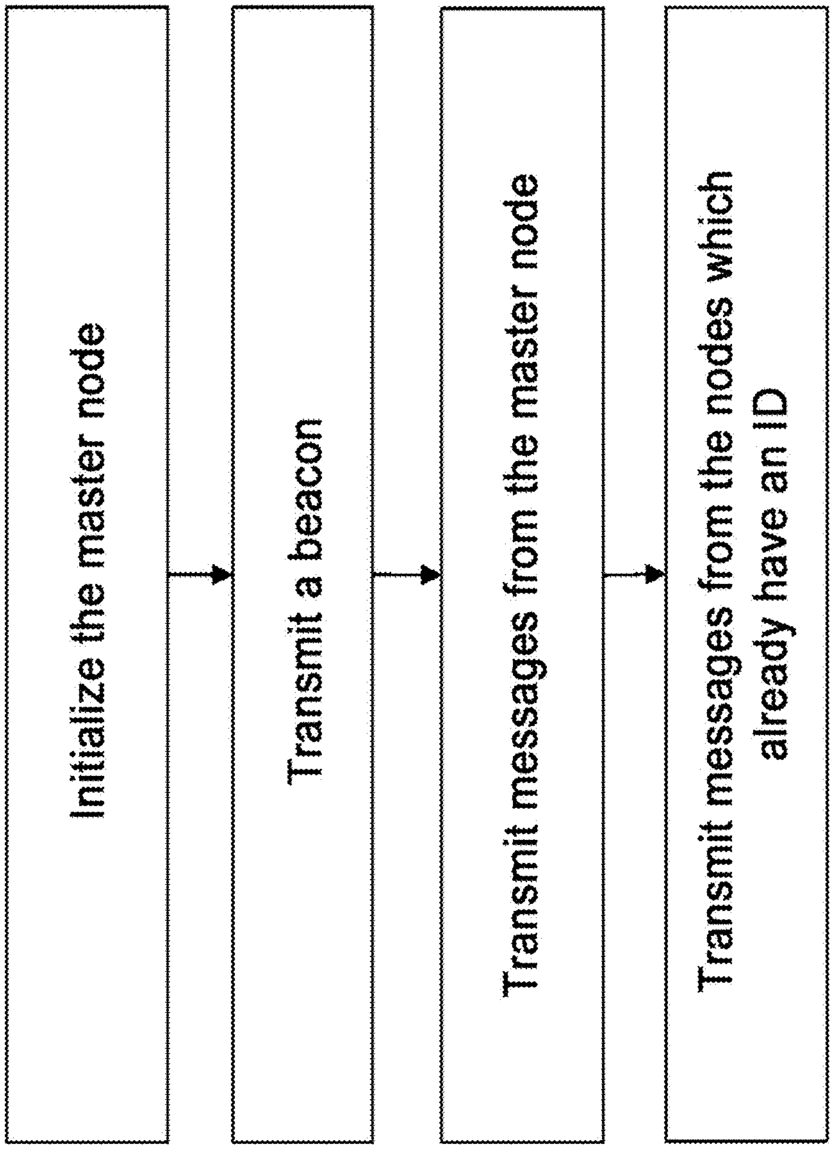
Figure 11:
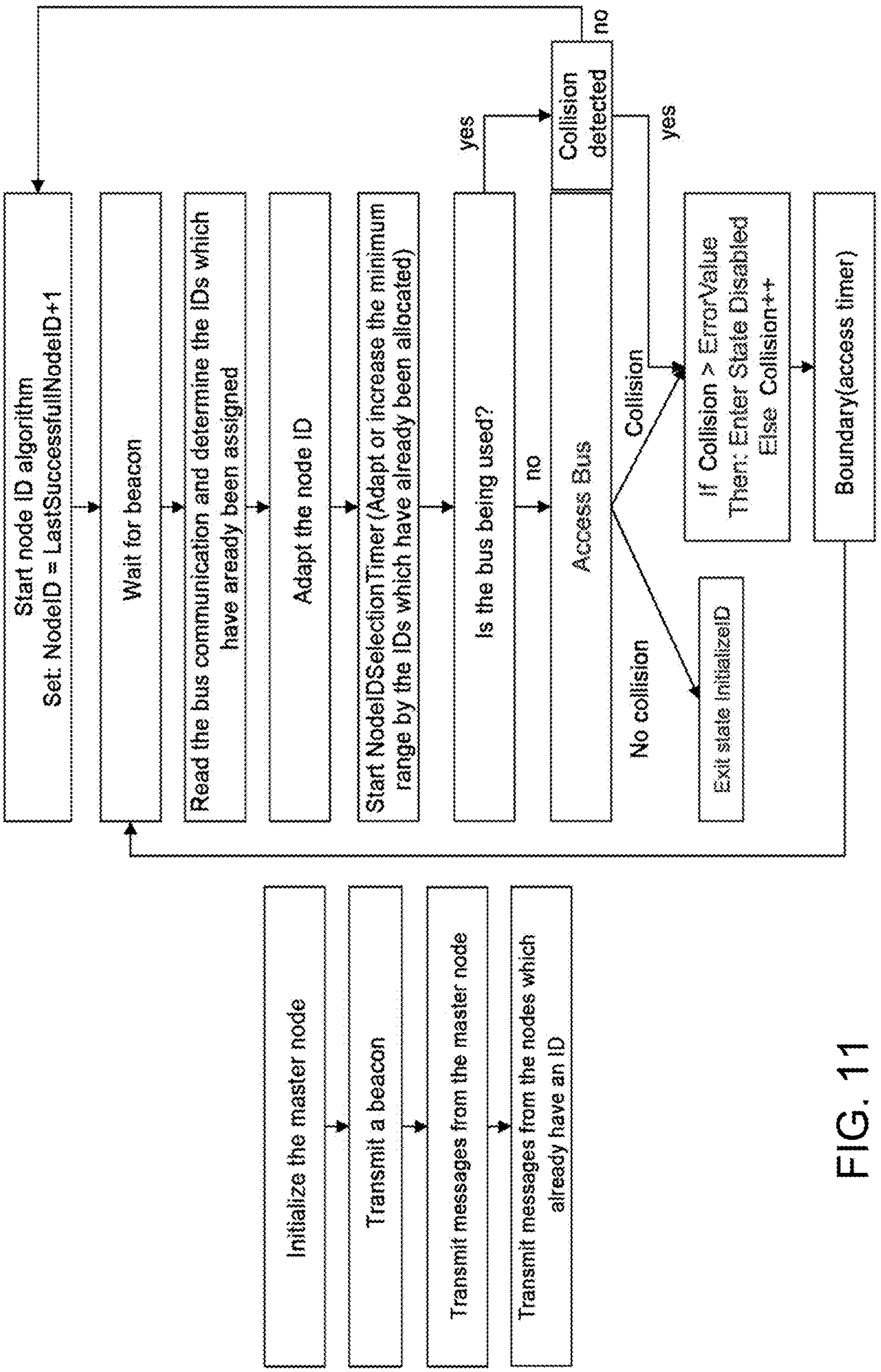

An exemplary embodiment of the present disclosure is depicted in the drawings and will be described in greater detail below. In the drawings:

FIG. 1 shows the simplified illustration of the differences between an Ethernet bus (10 Mbit/s) and a switched network;

FIG. 2 shows the basic flow of communication on the Ethernet bus;

FIG. 3 shows the physical representation of the Ethernet bus with stubs;

FIG. 4 shows the course of the method according to the present disclosure by way of ID allocation following successful bus access;

FIG. 5 shows extension of the standard to include automatic configuration of the node IDs (the boxes represent the course of the standard; the white boxes indicate how the method can be integrated into a standard);

FIG. 6 shows the automated bus access through local ID assignment;

FIG. 7 shows the setting of the timer range depending on the type of bus access;

FIG. 8 shows the variability of the range (timer) depending on different situations;

FIG. 9 shows the initialization of the bus (ID assignment) from the point of view of the master node;

FIG. 10 shows the special version of the initialization of the bus according to FIG. 9 (ID assignment) from the point of view of the master node in a plug and play network if control devices do not start up "at the same time", but rather are only later delayed; and FIG. 11 shows the plug and play manifestation stage of the automated bus access if control devices are only later delayed.

DETAILED DESCRIPTION

FIG. 1 shows the simplified illustration of the differences between an Ethernet bus (10 Mbit/s) and a switched network.

The present disclosure proposes a new method to optimize the efficiency of data transmission on the automotive 10 Mbit/s bus and to reduce the bus access time for the nodes.

FIG. 2 shows the basic flow of communication on the Ethernet bus. After the beacon has been transmitted, node 0 is next and, when it has finished its transmission, the next node is allowed to transmit (typically only a single Ethernet frame in each case may be transmitted in the slot).

The basic idea of the method according to the present disclosure describes a dynamic adaptation of the bus cycle. Unlike FlexRay, this has no negative or ill-considered effects. The nodes do not have a fixedly defined time window, but only follow an order. The head node also does not know which data are sent by the nodes beforehand.

FIG. 3 shows the physical representation of the Ethernet bus with stubs.

The method first determines all participants on the bus. This is typically statically preconfigured, since the head node needs to know this number of participants to schedule the flow.

FIG. 4 shows the course of the method according to the present disclosure by way of ID assignment following successful bus access.

FIG. 5 shows the extension of the standard to include automatic configuration of the node IDs, with the boxes representing the course of the standard. The white boxes show how the method according to the present disclosure can be integrated into the standard. This should make it clear where the method according to the present disclosure takes effect and how the standard can be modified without changing the general course. In this case, the nodes that have not yet been able to allocate an ID change to the Initialize ID state, with a check being performed in order to determine whether there is preconfiguration, and keep the default ID 255 or allocate this ID to themselves. The nodes remain in this state until they have had a successful bus access. In the Initialize Network state, the master node steps in when no slaves have been preconfigured for it, i.e., when it does not know its network. Only when it has initialized all slave control devices does it leave the state.

The head node then determines all sleeping or defective or inactive nodes on the bus. A distinction may be made here as to whether they are currently sleeping or whether a time in the future is known when the nodes are inactive—sleeping or inactive in this context means that they are not participating in the bus communication (either actively—transmitting payload data—or passively—receiving payload data). The head node receives this knowledge either via a higher software layer or application communicated by a message from one or the participant on the bus, for example response to a sleep/wake-up signal due to an error state of a node, for example through a request from the network management, checking of protocols, reading of registers on the node.

FIG. 6 shows the automated bus access through local ID assignment. The uninitialized participants on the bus wait for the beacon from the head node (master node). As soon as they recognize this beacon, they start the NodeIDSelectionTimer. The timers will have expired at different times for each node, since a random function is used here to select from a range of values—the control devices therefore do not have to work synchronously either.

The initialization starts with setting the local node ID (ID). This value is set from 255 to the lowest possible value that has not yet been used (important: there should be no gaps in the sequence).

LastSuccessfullNodeID is initialized with 0. The method therefore starts with ID=1 for all nodes. This is a local allocation in each case. Since all nodes or control devices can read activity on the bus, they always have the same ID and it is ensured that none is left out.

When the timer expires, they try to gain access to the bus. If the bus is already being used even before its own timer expires and no collision is detected, this means that the current ID is assigned and the next node ID is incremented by one. A further attempt is made to gain access to the bus.

If the bus has not yet been used and a collision occurs during access, a variable that counts the number of collisions is incremented. This is intended to prevent a deadlock from occurring. At a defined value (or time value) the process is then aborted.

If there is no collision, this ECU keeps the ID and the "Initialize ID" state is exited.

FIG. 7 shows the setting of the timer range depending on the type of bus access. The choice of the timer or its range, from which a selection is made using a random function, is decisive for the time until the bus is fully initialized.

The range (a range of numbers from x-y) varies over the phase of the initialization process. The range of numbers should be specified in such a way that on the one hand fast initialization and on the other hand few collisions occur. It is specified in "bit times" and starts at 20 bit times as the lower end.

The upper end (MaxValue) can either always be the same for all nodes or can also be lower or higher than the others in a priority-based manner, i.e. depending on the importance of the ECU. For example, if a large MaxValue is selected, then the probability of a bus access is higher for other ECUs than for this one, etc. Range [20 bits-MaxValue]

FIG. 8 shows variability of the range (timer) depending on different situations. For the fastest possible initialization, the notification of invention proposes a FastMode variable. This indicates the extent to which the range is reduced when a node has successfully accessed the bus and thus been allocated an ID. In the automotive sector, the number of nodes is currently very limited (typically 8), which is why the method can quickly lead to a final configuration. If collisions occur, the rank may be too small, for example. The method therefore proposes increasing this value. This is then also implemented on every node and not just on those that did not successfully access the bus. A larger range means that the probability of an ECU gaining access to the bus increases.

FIG. 9 shows the initialization of the bus (ID assignment) from the point of view of the master node. The master node also has to learn which and how many nodes there are in its network, because it adapts its bus cycle thereto. To do this, it transmits completely normal beacons in accordance with the standard. All bus participants can detect collisions, and so can the master node. It allows a counter to run in order to log how much troubleshooting there has already been and to be able to optionally intervene.

If a message is received successfully (no collision), it transmits a beacon and thus interrupts this cycle and thus confirms the assignment of this ID that has just been received. It also saves the ID/MAC address pair and optionally checks whether errors have occurred.

When its timer expires, it is set to be greater than the timer range of the slaves, and it has received neither a collision nor a frame. The bus is then initialized and changes into the normal mode. In doing so, it stipulates the number of participants and calculates the bus cycle, which it specifies. The bus can now be operated in normal operation.

FIG. 10 shows a special version of the initialization of the bus according to FIG. 9 (ID assignment) from the point of view of the master node in a plug and play network, i.e., when control devices do not start up "at the same time", but rather are only later delayed. The following figures show an example embodiment which is executed when the control devices are started with a delay. This method takes effect as long as the network is still in the initialization phase. To this end, the method proposes that, during the initialization method, data are sent from the control devices which have already allocated an ID. The content of the data is irrelevant.

By also reading the bus communication, the control devices can determine the current status of the initialization phase, even if they were only woken up/started later. The participants (who have not yet been allocated an ID) thereby recognize the highest ID that has already been assigned and then adjust their own ID. Furthermore, the timer (range) is adjusted.

FIG. 11 shows the plug and play manifestation stage of the automated bus access if control devices are only later delayed.

The beacon cycle (or when the next beacon is transmitted or how many nodes are active on the bus) may be calculated by determining the number of sleeping or defective or inactive participants. Per se, with the remaining number of active nodes, regardless of what ID they have, it may first be calculated how much time it is possible to save on the bus or by how much the bus cycle is able to be shortened.

With a cycle length in the normal mode of Z=participants*(transmission window+frame size), this is generally reduced to Z'=(participants-non-active participants)*(transmission window+frame size).

The intention is to determine the time at which the beacon was sent depending on the position (here: node ID) of the active/sleeping nodes. All nodes on the bus have a unique ID. The method uses the total number of nodes and the ID to determine the position of the sleeping participants per bus cycle. The number of participants on the automotive 10 Mbit/s Ethernet bus is limited by the bus topology, and it is thus easy to get an overview of whether there is an active node "behind" the sleeping or possibly faulty node (IDsleepingnode<IDactivenode).

If there is no further active node up to the highest ID, then the beacon cycle is adapted such that the beacon is set before the transmission slot, the so-called transmit opportunity, of the first sleeping node, which only has active nodes in front of it and sleeping nodes behind it. This method assumes that there is no further active node, or ECU, sensor, behind the sleeping node, that is to say higher ID, as indicated in FIG. 10. This probability is relatively high since the 10 Mbit/s Ethernet bus system in the automotive environment is nowadays typically designed for eight (8) ECUs.

The intention is to shorten and optimize the cycle time by sending the next beacon frame ahead of time in the case of exclusively inactive participants at the "end" of the bus, i.e., the highest node IDs. However, if a node with a small ID no longer participates on the bus, then the invention proposes adapting or optimizing the IDs of the participants. There are multiple proposals according to the present disclosure for this; the selection or a combination of the method can be adapted depending on the application case:

The IDs of all active participants on the bus with a higher ID are reduced by the number of sleeping nodes before them. If, for example, ID 3 is sleeping, then ID 4 is reduced by one. This maintains the transmission order of the bus participants.

Another possibility is to fill up the sleeping IDs with participants with the highest ID. If ID 3 is sleeping, then this ID is reassigned to the highest one (for example ID 8). Although this changes the order of the bus participants, fewer bus participants need to be reconfigured.

To avoid useless optimization or adaptation of the bus cycle, the method proposes determining the current bus loading. The current loading may be determined by the time difference of the last beacons and the number of participating nodes. If the bus loading is low, it may be statistically assumed that it will not increase abruptly toward the next cycle. However, it is still possible to react to any changes, as it is proposed to monitor the bus loading continuously.

In the last step, the bus cycle is adapted in respect of the necessary data rate. Two possibilities will be proposed later for this.

In one advantageous substep, the method in which the necessary data rate is compared to the current bus capacity may be determined. First, the necessary download data rate is calculated here in relation to the 10 Mbit bus. Then the number of active nodes is determined by the head node. The slots of the inactive participants, either only passively listening, in the error state, or in the sleep mode, are determined and are to be made available by the method for the head node, which is referred to as $D_{frei}$.

This already results in an optimization of the bus without in the process actively intervening in the ongoing communication or without in the process muting nodes. The real data rate can then also be reported back to the application without always having to assume the worst case. This saves memory and gives the application, possibly also the driver, a real time window back. This method is the first step toward optimizing the cycle.

Another possible optimization step is described, to prevent a subset (or also all) of the other participants on the bus (except of course the head node) from transmitting, based on the calculated, necessary data rate at the head node, and thus to reduce the cycle time for the purpose of the download (or security update), so that the head node is able to serve its necessary data rate, even if, according to normal bus operation, there would not be enough bandwidth available. For this purpose, the amount of data the head node would still have to transmit in the current cycle is constantly compared, wherein this value is taken as a limit value, which must not fall below 0 in this cycle and wherefore the cycle would be terminated before by the transmission of the next beacon. This method results in the highest possible fairness toward the other bus participants, because, only within certain tolerances, as much bandwidth as needed is used for the head node and the rest is still available for use by the following nodes. The number of nodes that may still transmit in a cycle due to this remaining bandwidth cannot be predicted exactly, since each bus participant may be between 0 (transmits no data at all), 64 (transmits a minimum Ethernet frame) and 1522 bytes (transmits a maximum Ethernet frame).

To increase fairness even further, it is proposed that, in the event that a node is no longer able to transmit and the cycle is terminated by the next beacon (because the remaining necessary data rate in that slot falls below a potential maximum Ethernet frame), the "remaining bandwidth" is carried over into the next cycle and released for use by the other bus participants in the next cycle. In this way, a kind of "credit" may be built up despite the bandwidth requirement at the head node being met.

However, to prevent the credit from increasing too much and thus potentially causing large data bursts in which many of the other bus participants are able to transmit large amounts of data unhindered, it is likewise proposed to limit the increase in the credit, either in terms of time by saturating or resetting the credit after a configurable period of time in seconds, or by a cycle counter when saturating or resetting the credit after a configurable number of bus cycles.

This type of cycle optimization is not the only conceivable one. An intermediate solution between "no fairness" and "greatest possible fairness" could be a simpler method, for example, in which only the head node is allowed to transmit over multiple cycles and a large credit builds up accordingly quickly. After a certain threshold value, this may then be reduced in one go by then inserting a cycle in which all nodes are given the opportunity to transmit before they then have to "stop" again for a certain number of cycles. If desired, in order to simplify the method, this variant may also be implemented without any consideration of credits, but simply according to the number of cycles—for example "only head node transmits for 99 cycles, then all nodes transmit for 1 cycle". In this case, however, a certain jitter (variance) in the data rate of the head node cannot be excluded.

The method according to the present disclosure may be performed through alternative method steps by means of which, after determining the number of active nodes, the unused transmission possibilities are determined and the absolute data rate for the head node is thereby calculated per time unit.

In the following, the method proposes determining the trustworthiness of a communication partner or its application. If this trustworthiness is determined, sensitive data can therefore be exchanged.

The head nodes on the server, for example, are typically connected on the PCB (printed circuit board) via MII (Media Independent Interface) or PCI Express and thus always manage without transceivers (PHYs).

An Ethernet transceiver (PHY) causes a delay in the 3-digit nanosecond range. This sounds small, but the delay on layer 2 (MAC) is approximately in the 1-digit nanosecond range or tends toward 0—depending on how high the resolution of the measurement is.

The method first of all determines the address of the application with which data are to be exchanged (received, sent or both).

The method then starts a propagation time measurement for this component. For example, the PDelay_Request method of the gPTP protocol (or 802.1AS) may be used here. Two responses are sent back in response, and hardware timestamps can be used to determine the travel time of the message. (The use of a protocol with hardware timestamps is important—NTP, for example, is thus ruled out because the resolution is too imprecise).

With the help of this calculated value, the method calculates the physical distance to this participant. The distance is not directly expressed here by a unit of measurement such as meters or centimeters, but can be converted to the number of components (PHYs, switches) that are part of the connection, since this delay is significant in contrast to the delay on the actual cable.

As an alternative, the method measures the propagation time to a participant/address by starting propagation time measurements (for example part of the PTP protocol) and by calculating the distance to this participant therefrom.

The measured propagation time must first be evaluated in order to provide an indication of the location. The software cannot know whether or not a partner is located within the same ECU, or ideally it must not know if generalized SW and not a special version is used; in addition, IP addresses may be falsified or changed. The propagation time of an MII-based connection does not need PHYs (transceivers). However, neither the time synchronization software nor the actual application commissioning this investigation knows this. A PHY converts the data into electrical signals and encodes them, which takes much more time than when two Ethernet MACs communicate with each other over the MII-based lines.

The method presented also recognizes whether a participant is connected directly to the requesting participant. If this is not the case, the respectively appropriate protocol may be selected depending on the latency. For example, MAC-Sec or IP-Sec could be used for latencies that apply within the vehicle, and other IP/TCP-based methods could be used if the latency is so high that the participant is undoubtedly outside the vehicle.

The invention claimed is:

1. An Ethernet network for a motor vehicle, comprising:

a first node and a second node, wherein the first and second nodes are connected to one another via at least one connection path, the first node is configured to;

transmit a signal to a second node of the Ethernet network and receive a response signal therefrom;

determine a propagation time on a connection path to the second node;

determine a maximum speed of the connection path based on the propagation time; and determine a type of a transmission medium of the connection path based on the maximum speed;

wherein the first and second nodes are connected to one another via the connection path;

wherein the Ethernet network further comprises a third node which is connected to the first node only indirectly and connected to the second node directly by way of a second connection path, and the third node is configured to determine a propagation time of a second signal on the second connection path;

wherein the first node is configured to trigger the determination of the propagation time of the second signal by way of a service message to the third node; and wherein each of the first, second and third nodes comprises a microprocessor, a volatile memory and a non-volatile memory, at least two communication interfaces, and a synchronizable timer.

2. The Ethernet network as claimed in claim 1, wherein at least one of the first node, the second node or the third node is an active node in the Ethernet network, wherein after each active node has been identified, the active node is dynamically configured and a timer of the active node is selected and started, and each active node assigns to itself an ID having a smallest value that had not yet been previously used, thereby leading to a bus access attempt on a bus of the Ethernet network by the active node and, if there is bus activity on the bus of the Ethernet network, other active nodes in the Ethernet network behave passively.

3. The Ethernet network as claimed in claim 2, further comprising a head node configured to:

determining, by a head node, a number of the active nodes in the Ethernet network;

classifying, by the head node, the active nodes into two or more classifications of nodes in order to prioritize Ethernet network communication;

receiving, by the head node, reservation requests from at least some of the active nodes; and allocating time slots, in response to reservation requests, to one or more of the active nodes in an upcoming communication window, the time slot allocations being based on a priority of the active nodes and the priority being allocated to the active nodes in accordance with their classification.

4. The Ethernet network as claimed in claim 3, wherein when there is a bus access attempt that is successful by an active node, the timer thereof is incremented, and when there is a bus access attempt that is unsuccessful by the active node, the timer is decremented.

5. The Ethernet network as claimed in claim 2, wherein when there is a bus access attempt that is successful by an active node, the timer thereof is incremented, and when there is a bus access attempt that is unsuccessful by the active node, the timer is decremented.

6. The method of claim 1, wherein when there is a bus access attempt that is successful by an active node, the timer thereof is incremented, and when there is a bus access attempt that is unsuccessful by the active node, the timer is decremented.

* * * * *